United States Patent Office 3,448,060
Patented June 3, 1969

3,448,060
SUPPORTED SKELETAL NICKEL CATALYST
David McArthur Mason, Chicago, Ill., assignor to Institute of Gas Technology, a not-for-profit corporation of Illinois
No Drawing. Filed May 2, 1966, Ser. No. 547,041
Int. Cl. B01j 11/28
U.S. Cl. 252—466         14 Claims

ABSTRACT OF THE DISCLOSURE

A method for making coated structures which are useful as a catalyst by coating a support with a slurry of pulverized aluminum-nickel alloy and then treating the coated form with water and optionally with an alkali hydroxide.

---

This invention relates to new and improved nickel-containing alloy materials suitable for making into catalyst structures and a method for making such materials. In particular, the invention relates to an alloy material and a method for making it wherein a coating of pulverized aluminum-nickel alloy is coated on a metal or ceramic form, such as a pellet or Berl saddle, and subsequently treated to render the coating hard throughout and resistant to abrasion, thus minimizing loss of the coating material during subsequent handling and activation to catalyst. Alternatively, the pulverized aluminum-nickel alloy is formed into shapes without support and treated to render the shape hard. Subsequently, the alloy material is treated to form a skeletal nickel catalyst.

By way of background, skeletal nickel catalysts are commonly made by leaching a crushed nickel-aluminum alloy containing 30–50% nickel (Raney alloy) with alkali hydroxide, such as sodium hydroxide, until the aluminum is completely dissolved as sodium aluminate, leaving the nickel as a very finely divided powder of particle size passing through a 200-mesh sieve. Another method of preparation in which there is produced a coarser powder suitable for fluid bed processing is described by H. A. Dirkson and H. R. Linden in Research Bulletin No. 31 of the Institute of Gas Technology, Chicago, published July 1963. In this method, only enough sodium hydroxide is added to start the reaction, for example just enough hydroxide to react with about four percent of the aluminum in the alloy. However, the aluminum in the alloy continues to react with the water after exhaustion of sodium hydroxide, precipitating as aluminum hydroxide instead of remaining in solution as sodium aluminate, according to the reaction

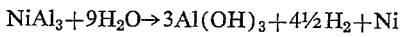

The precipitated aluminum hydroxide serves as a matrix holding the particles of skeletal metallic nickel. X-ray examination indicates that the crystallite size of the nickel is in the range of 50 to 100 angstroms, similar to that of conventional skeletal nickel catalyst. The leaching reaction is continued until 30 to 80% of the alloy has reacted. The unreacted alloy serves as a support for an outer catalytic zone, which consists of skeletal metallic nickel as the active constituent mixed with hydrated alumina. The catalyst consists of particles in the size range passing a 40-mesh sieve but retained on a 200-mesh sieve.

The catalysts above described are coarse compared to the conventional Raney catalyst but are too fine for practical use in fixed bed catalytic processes. It is therefore desirable to be able to produce the catalyst in shapes and forms to provide a lower pressure drop across a fixed bed reactor than when using catalyst in fine powder form.

It is therefore an object of this invention to provide a catalyst structure wherein an alloy material from which catalyst is to be made can be coated on an inert carrier to provide a good surface distribution of catalyst material.

It is a further object of this invention to provide a coating method for coating an aluminum-nickel alloy in pulverized form on inert base material whereby said coating is rendered hard and resistant to abrasion during handling or activation.

Another object of this invention is to provide a method for making unsupported catalyst shapes which can be hardened.

Broadly, my invention comprises coating pulverized aluminum-nickel alloy slurried with freshly precipitated aluminum hydroxide on metal or ceramic forms which serve as supports and treating the coated supports to render the coating hard and resistant to abrasion for leaching to form an active skeletal nickel catalyst.

In my process, crushed aluminum-nickel alloy is slurried with water containing aluminum nitrate or other soluble aluminum salt, and ammonium hydroxide is added to precipitate aluminum hydroxide. Ceramic or metal support forms are coated with the slurry and the coated forms are dried. The coating is hardened by heating in water. The coating may then be leached by heating in water, with addition of sodium hydroxide in amounts sufficient to dissolve from 2 to 5 wt. percent of the aluminum in the alloy, until from 30 to 100 percent of the aluminum has reacted with sodium hydroxide or with water, as described in the Institute of Gas Technology reference hereinabove cited.

The support forms can take any shape that provides sufficiently low-pressure drop through the reactor, for example a Raschig ring. They may be made of ceramic or metal, such as nickel, that will not itself or as a corrosion product interfere in the reaction which is to be catalyzed. Preferably, the form to be used is composed of ceramic, for example, in the form of a Berl saddle or similar shape which affords high permeability to flow of gas or liquid reactant. Such saddles are commercially available in outside dimensions ranging from one-quarter inch to several inches. Small sizes will usually be most economical in providing the required amount of active surface. The catalyst coating can also be applied to cylindrical ceramic pellets which are available in still smaller sizes, or to other shapes.

In the coating process of my invention, a slurry or paste is prepared consisting of pulverized aluminum-nickel alloy and a solution containing aluminum nitrate equivalent to about one weight percent of aluminum oxide. The alloy used contains from 50 weight percent to 70 weight percent aluminum, preferably about 58 weight percent of aluminum. Ammonium hydroxide is added to the pulverized material until the mixture is neutral or slightly alkaline to litmus to form freshly precipitated aluminum hydroxide. The slurry is then stirred with the support forms until the slurry covers substantially all surfaces of the forms, or the slurry may be applied to the forms by spraying or other suitable means. The forms are then spread out to dry without contacting one another, and are heated from about 50° C. up to about 500° C. for at least two hours. I have found that this heating step is essential since otherwise a large part of the alloy coating is washed off the forms in the following step where the coated forms are covered with water. Next, the coated forms are placed in water at temperatures up to 100° C. Up to this point the coating is in a friable form easily removed by abrasion. Quite unexpectedly, treating of the forms with water causes a hardening of the coating which becomes more firmly attached to the form and prevents subsequent loss during handling and activation.

My invention also contemplates the technique of extruding, pressing or casting the aluminum-nickel slurry into shapes such as pellets, wire forms, or other desirable shapes for catalyst particles which can then be dried and hardened by heating as above described and finally leached to form an active skeletal nickel catalyst. By using the dry and wet heating steps of the method above described, the final catalyst forms are hardened and strengthened so as to resist abrasion and loss of material during handling and leaching.

Activation or leaching of the alloy is not per se part of my invention and may be carried out in a manner well known in the art as described hereinabove.

The following non-limiting examples illustrate two embodiments of my invention:

Example I

Equal parts by weight of three sieve fractions, namely a fraction passing 200-mesh, a fraction passing 140-mesh but retained on 200-mesh, and a fraction passing 100-mesh but retained on 140-mesh, of aluminum-nickel alloy containing about 58 weight percent aluminum were mixed to the amount of 94.3 grams. A slurry of the alloy powder was made by adding 35 ml. of a solution containing 7.35 grams of aluminum nitrate nona-hydrate per 100 ml. of water, and adding to the alloy-solution mixture ammonium hydroxide to a pH of 7. Half of the resulting slurry was added to 50½-inch stoneware Berl saddles. After stirring to spread the slurry on the saddles, the saddles were spread out to dry, then heated in an oven at 120° C. overnight, about 19 hours. At this point there was 41.4 grams of alloy on the 50 Berl saddles, which uncoated weighed 74.4 grams.

The coated saddles were then covered with water which was heated to about 60° C. Evolution of hydrogen started. After about a minute, the heat was turned off and the saddles cooled by adding water. They were then transferred to a 750 ml. Erlenmeyer flask for leaching. Leaching was carried out in boiling water over a period of 22½ hours with the addition of sodium hydroxide in increments to a total of 0.9 gram. The amount of hydrogen evolved was 0.44 standard cubic feet, equivalent to 39 percent of aluminum reacted.

Example II

Aluminum hydroxide was precipitated from 97 ml. of an aqueous solution containing aluminum nitrate in an amount equivalent to one wt. percent of aluminum oxide, by addition of ammonium hydroxide to a pH of 7. Nickel-aluminum alloy powder passing a 140-mesh sieve but retained on a 200-mesh sieve, containing about 58 wt. percent aluminum, was slurried with this aqueous suspension. About 400 grams of this alloy sieve fraction was used. The slurry was placed in the depressions of a mold made of corrugated aluminum foil. The molded alloy was dried and heated in an oven for 3 hours at 150° C., then was placed in water at 50–60° C. for a few minutes then was allowed to stand in water at room temperature over a weekend. The molded alloy was transferred to a flask and leached by heating in sodium hydroxide solution that was increased in concentration from time to time up to a concentration of about 6 percent. Leaching was continued for 53 hours during which about 59 percent of the theoretical amount of hydrogen to be expected from complete conversion of the aluminum in the alloy was evolved.

Catalyst made from the alloy material of my invention is particularly useful in a steam-reforming process for making high-methane content product gas. The following examples illustrate typical reforming processes with which the catalyst is useful.

Example III

A steam reforming pilot unit was employed in the gasification of a mixed paraffinic hydrocarbon feedstock for the production of a maximum methane content product gas. The said feedstock was a light naphtha. The pertinent properties of the said feedstock were as follows:

Specific gravity—70.3° API
ASTM distillation range—167° F. to 194° F.

| Composition: | Volume Percent |
|---|---|
| Aromatics | 2.0 |
| Olefins | -- |
| Saturates | 98.0 |
| Total | 100.0 |

Run conditions were as follows, the catalyst being made as described in Example II above:

Catalyst volume—100 cc.
Reactor pressure—350 p.s.i.g.
Maximum bed temperature—900° F.
Steam-to-naphtha weight ratio—1.70.
Naphtha space velocity—1.82 lb./hr.–lb. catalyst

| Product gas composition (water-free): | Mole Percent |
|---|---|
| $N_2$ | 0.1 |
| CO | 0.2 |
| $CO_2$ | 22.9 |
| $H_2$ | 11.6 |
| $CH_4$ | 64.9 |
| $C_6+$ | 0.3 |
| Total | 100.0 |

Removal of carbon dioxide down to 2 mole percent of the product gas results in the following composition:

| Composition: | Mole Percent |
|---|---|
| $N_2$ | 0.1 |
| CO | 0.3 |
| $CO_2$ | 2.0 |
| $H_2$ | 15.3 |
| $CH_4$ | 81.9 |
| $C_6+$ | 0.4 |
| Total | 100.0 |

Specific gravity (air=1.00)—0.511
Higher heating value—884 B.t.u./s.c.f.

Example IV

A steam-reforming pilot unit was employed in the gasification of a mixed paraffinic hydrocarbon feedstock for the production of a maximum hydrogen content product gas. The feedstock was a light naphtha. The pertinent properties of the said fedstock were as follows:

Specific gravity—70.3° API
ASTM distillation range—167° F. to 149° F.

| Composition: | Volume Percent |
|---|---|
| Aromatics | 2.0 |
| Olefins | -- |
| Saturates | 98.0 |
| Total | 100.0 |

Run conditions were as follows, the catalyst being made as described in Example II above:

Catalyst volume—100 cc.
Reactor pressure—350 p.s.i.g.
Maximum bed temperature—1300° F.
Steam-to-naphtha—8.49
Naphtha space velocity—1.89 lb./hr.–lb. catalyst
No carbon deposition occurred.

Product Gas Composition (water-free) was as follows:

| Composition: | Mole Percent |
|---|---|
| $N_2$ | 0.7 |
| CO | 4.2 |
| $CO_2$ | 19.2 |
| $H_2$ | 69.4 |
| $CH_4$ | 6.2 |
| $C_2H_6$ | 0.2 |
| $C_6+$ | 0.1 |
| Total | 100.0 |

Having described my invention, it should be clear to those skilled in the art that various modifications may be made thereto within the spirit of the invention which I intend to be limited solely by the following claims.

I claim:
1. Method for making coated structure useful for making into a catalyst comprising coating inert support forms with an aqueous slurry of pulverized aluminum-nickel alloy and freshly precipitated aluminum hydroxide, drying said coating, heating the resultant coated forms at minimally 50° C., and immersing said forms in water at about 25° C. to about 100° C., whereby evolution of hydrogen is started and said coating is hardened.
2. Method of claim 1 further comprising the step of leaching the hardened coating with an alkali hydroxide solution to remove at least part of the aluminum therein as aluminate.
3. Method of claim 1 wherein said support forms are ceramic or metal.
4. Method of claim 1 wherein said heating is effected for minimally two hours.
5. Method of claim 1 wherein said aluminum-nickel alloy contains 50 to 70 weight percent aluminum.
6. Method of claim 1 wherein said slurry of pulverized aluminum-nickel alloy is in an aqueous solution which contains aluminum nitrate.
7. Method of claim 1 wherein said water temperature is from 60 to 100° C.
8. The product produced by the method of claim 2.
9. Method for making catalyst structure comprising forming a slurry of pulverized aluminum-nickel alloy and freshly precipitated aluminum hydroxide, making from said slurry a plurality of objects shaped for use as catalyst particles, heating said shaped objects at minimally 50° C. until said objects are dry, and immersing said objects in water at a temperature of from 25 to about 100° C. whereby hydrogen is evolved and the external surface of said objects is hardened.
10. Method of claim 9 further comprising leaching said shapes with alkali hydroxide solution to dissolve at least part of the aluminum as aluminate to thereby obtain an active skeletal nickel catalyst.
11. Method of claim 9 wherein said heating for drying is effected for minimally two hours.
12. Method of claim 9 wherein said aluminum-nickel alloy contains 50 to 70 weight percent aluminum.
13. Method of claim 9 wherein said water temperature is 60 to 100° C.
14. The product produced by the process of claim 10.

References Cited

UNITED STATES PATENTS

| | | | |
|---|---|---|---|
| 2,928,891 | 3/1960 | Justi et al. | 252—466 |
| 2,950,260 | 8/1960 | Rosenbaum et al. | 252—466 |
| 2,975,041 | 3/1961 | Holman | 23—143 |
| 2,980,632 | 4/1961 | Malley et al. | 23—143 |
| 3,087,234 | 4/1963 | Alexander et al. | 75—170 |
| 3,112,995 | 12/1963 | Hoekstra | 23—143 |
| 3,264,228 | 7/1966 | Burbidge | 252—463 |
| 3,317,439 | 5/1967 | Stiles | 252—463 |

DANIEL E. WYMAN, *Primary Examiner.*

P. E. KONOPKA, *Assistant Examiner.*

U.S. Cl. X.R.

23—212; 48—214; 117—62, 160, 169; 252—477